United States Patent [19]

Godshalk et al.

[11] Patent Number: 4,894,805

[45] Date of Patent: Jan. 16, 1990

[54] SECURITY PRINTER/COPIER

[75] Inventors: Russell L. Godshalk, Hilton; Gary W. Shope, Rochester, both of N.Y.

[73] Assignee: Eastman Kodak Company, Rochester, N.Y.

[21] Appl. No.: 187,135

[22] Filed: Apr. 28, 1988

[51] Int. Cl.$^4$ ............................................. G11C 7/00
[52] U.S. Cl. ................................................ 365/222
[58] Field of Search ........................... 365/222; 360/60

[56] References Cited

U.S. PATENT DOCUMENTS

| 4,069,511 | 1/1978 | Lilke | 364/200 |
|---|---|---|---|
| 4,149,270 | 4/1979 | Cricchi et al. | 365/222 |
| 4,468,759 | 8/1984 | Kung et al. | 365/222 |
| 4,546,273 | 10/1985 | Osman | 365/222 |
| 4,551,822 | 11/1985 | Takemac et al. | 365/222 |
| 4,578,782 | 3/1986 | Kraft et al. | 365/222 |
| 4,587,559 | 5/1986 | Longacre et al. | 365/222 |
| 4,628,488 | 12/1986 | Kawasaki et al. | 365/222 |

FOREIGN PATENT DOCUMENTS 2175111 11/1986 United Kingdom .
WO88/01768 3/1988 World Int. Prop. O. .

OTHER PUBLICATIONS

Patent Abstracts of Japan, vol. 8, No. 163 (P-290) (1600), Jul. 27, 1984 & JP, A, 5958691 (Fujitsu K.K.), Apr. 4, 1984, see abstract.
Patent Abstracts of Japan, vol. 6, No. 133 (P-129) (1011), Jul. 20, 1982 & JP, A, 5757365 (Canon K.K.), Apr. 6, 1982, see abstract.
Patent Abstracts of Japan, vol. 10, No. 111 (P-451) (2168), Apr. 25, 1986 & JP, A, 60242589 (Nippon Denki K.K.), Dec. 2, 1985, see abstract.
IBM Technical Disclosure Bulletin, vol. 18, No. 5, Oct. 1975, F. J. Aichelmann et al.: "Memory Initialization by Deferred Refresh", p. 1457, see p. 1457, lines 1-7.

Primary Examiner—James W. Moffitt
Attorney, Agent, or Firm—Milton S. Sales

[57] ABSTRACT

A printer/copier which stores job image data in memory before reproduction has a "refresh period" after which data stored therein will degrade if the device is not refreshed. Upon completion of a "security" job, DRAM refresh and normal read or write operations are disabled for a time period sufficient to allow the data resident in the DRAM to degrade.

4 Claims, 2 Drawing Sheets

SECURITY PRINTER/COPIER

BACKGROUND OF THE INVENTION

1. Field of the Invention

This invention relates generally to electronic printer/copiers having memory for storing reproduction jobs, or portions of jobs, and more particularly to security of such printer/copiers to inhibit unauthorized access to such jobs.

2. Description of the Prior Art

Electronic printer/copiers and similar devices generally store job data in memory before reproduction. Conventionally, the memory consists of dynamic random access memory (DRAM). In some instances, the amount of data can be substantial; even to the degree of storing an entire multiple page reproduction job.

The image data stored in memory remains resident in the memory after that image has been reproduced, even though the pointers to that data have been lost. This presents a security problem if the printer/copier is unattended after a confidential job has been run and before the memory locations are overwritten by the next job. A non-authorized person could access the memory and obtain a print out of the image data therein.

One solution is to "clear" the memory by writing to every location in memory immediately following the reproduction job. However, this requires a substantial amount of time in which the printer/copier would be disabled. For example, a thirty two Megabyte memory would require and excess of eight minutes to clear by writing to every location.

SUMMARY OF THE INVENTION

Accordingly, it is an object of the present invention to provide security for printer/copiers which store job image data in memory before reproduction while overcoming the delay disadvantage associated with clearing memory by writing to memory locations.

Data stored in DRAM will tend to degrade with time and temperature. Therefore, to retain the correct information, the bits need to be refreshed within a manufacturer-specified "refresh period". This property of DRAM, in which data stored therein will degrade if the device is not refreshed, is used in the present invention to provide job security. Briefly, upon completion of a "security" job, DRAM refresh and normal read or write operations are disabled for a time period sufficient to allow the data resident in the DRAM to degrade.

In a preferred form, the invention includes a copier/printer having a memory for storing job image data, the memory being of the type requiring periodic refresh to prevent degradation of stored data. The improvement comprises security means for disabling memory refresh for a time period sufficient to allow the data to degrade sufficiently to be unrecoverable in recognizable form.

Embodiments of the invention include a DRAM refreshed by application of a Row-Access-Strobe clock signal, wherein the security means comprises means for inhibiting application of Row-Access-Strobe clock signals to the dynamic random access memory. The DRAM is also refreshed by read and write operations; so the security means comprises means for disabling read and write operations to the dynamic random access memory.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENT

Figure 1:
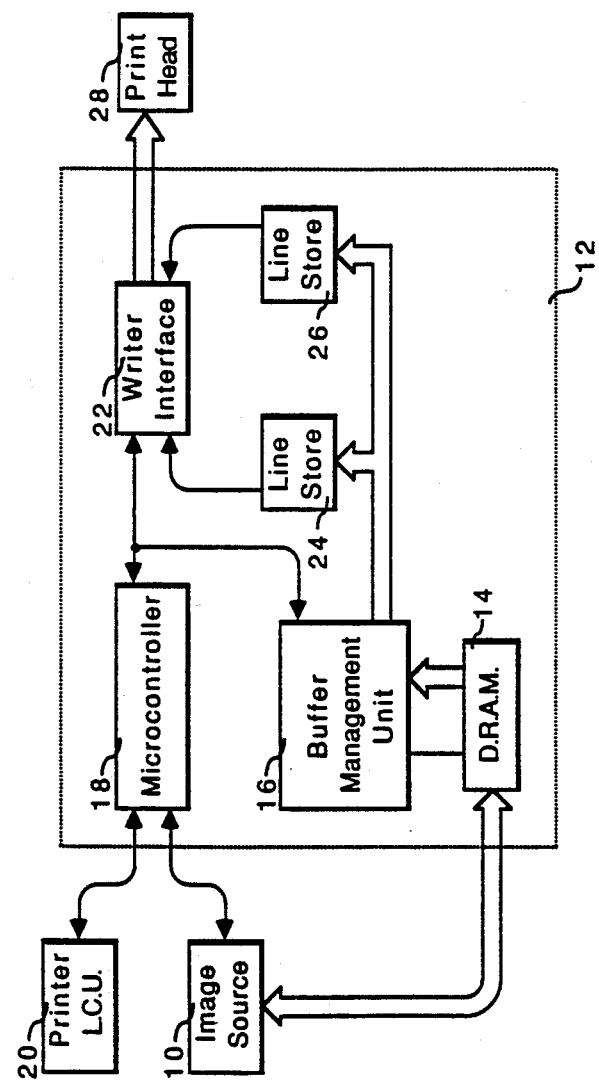
FIG. 1 is a simplified schematic diagram of an electronic printer/copier usable with the present invention.

Referring to FIG. 1, printer/copier elements are interconnected by a series of image and control data links shown as double-line arrows and of control signal links shown as single-line arrows. Document scanners and rasterized data from computer terminals, main frames, and the like (referred to generally as image source 10) produce reproduction jobs as a video data stream for printing pixel by pixel.

A job image buffer 12 receives the image data stream from image source 10. The heart of the job image buffer is a large bank of dynamic random access memory (DRAM) 14 for storage of the image data.

A buffer management unit 16 acts as a DRAM controller, arbitrating between memory read, write, and refresh cycles. A microcontroller 18 functions as the system manager, overseeing the overall operation of the job image buffer. The microcontroller will handle communication with a logic and control unit (LCU) 20 of the printer/copier, store the internal pointers identifying the beginning and ending addresses for each image, and initiate transfers from image source 10.

A writer interface 22 receives a full line of image data from DRAM 14, and has a pair of line stores 24 and 26 and random logic to re-sequence the data stream before sending it to a print head 28.

DRAM design is based on capacitor charge storage for each bit in the array. This charge will tend to degrade with time and temperature. Therefore, to retain the correct information, the bits need to be refreshed within a manufacturer-specified "refresh period", typically between about two to eight milliseconds. This is accomplished by sequentially cycling through the row address locations every refresh period.

A normal read or write operation to the DRAM will serve to refresh all the bits associated with that particular row decoded. However, when the memory component is in standby, a "Row-Address-Strobe-only" refresh scheme is employed. This refresh method performs a row-address-strobe-only cycle on all row addresses every refresh period. The row addresses are latched with a Row-Address-Strobe clock, and the associated internal row locations are refreshed.

This property of DRAM, in which data stored therein will degrade if the device is not refreshed, is used in the present invention to provide job security. Briefly, upon completion of a "security" job, DRAM refresh is disabled for a time period sufficient to allow the data resident in the DRAM to degrade. Normal read and write operations are also disabled for the time period to prevent operator access to the stored information while it is degrading and to prevent refreshing the DRAM by such operations.

Figure 2:
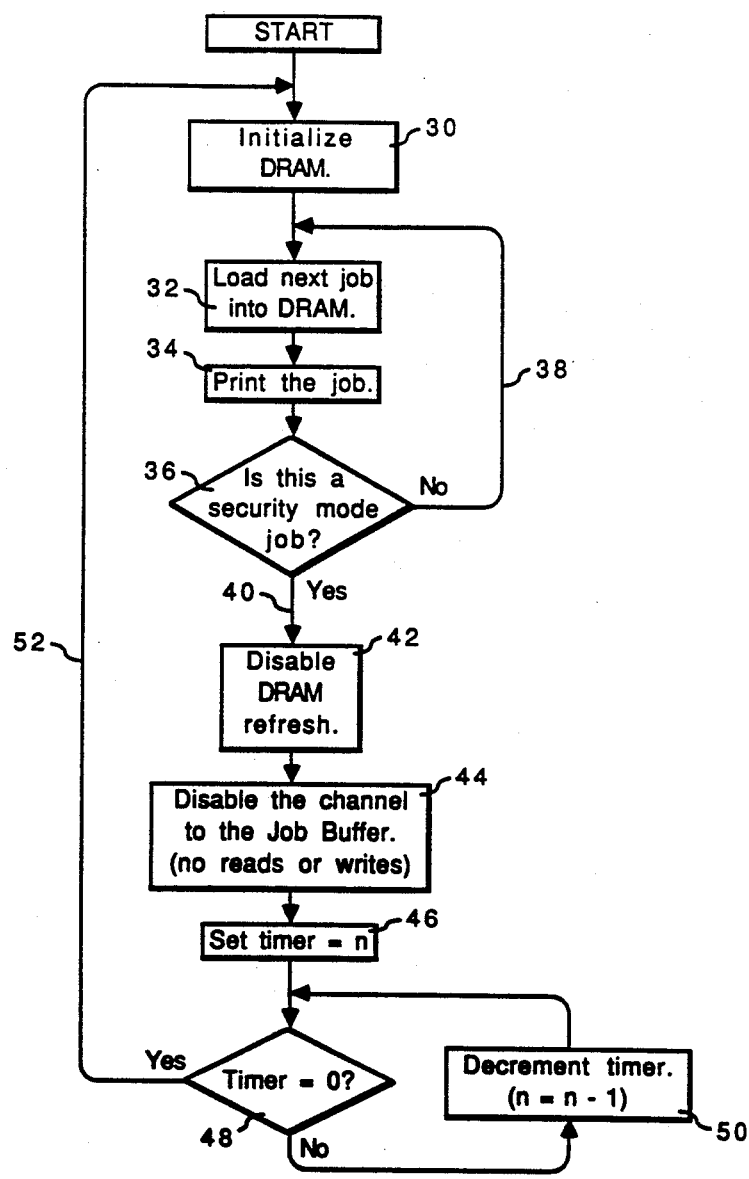
FIG. 2 is a logic flow diagram of the operation of the printer/copier of FIG. 1.

Reference is now made to FIG. 2, which shows process steps to be followed by the system according to the present invention. A conventional microprocessor, a programmable logic array, or discrete logic could be implemented to perform the functions shown in the flowchart.

As illustrated by functional block 30, DRAM devices require an initialization period upon power-up. An initial pause of say 100 microseconds is required to establish correct bias voltage. This is to be followed by a minimum number (typically eight) active cycles of the Row-Address-Strobe clock to initialize the various dynamic nodes internal to the device.

After initialization, data can be stored in, and randomly accessed from, DRAM in a two dimensional matrix by row and column, as represented by functional block 32 of FIG. 2. DRAM addressing is effected on a plurality of address pins, which are time multiplexed with two separate 8-bit address fields that are strobed at the beginning of the memory cycle by two clocks, one the Row-Address-Strobe referred to above, and the other called the Column Address Strobe.

The job is printed on command (functional block 34) and the logic enters a decisional block 34. Decisional block 36 tests the job to determine if it has been operator-designated as secret. If the job does not require security, the logic exits the decisional block along a path 38 to load the next job.

If the decision from decisional block 36 had been "yes" instead of "no," then the logic would have exited block 36 along a path 40 into a functional block 42 to disable DRAM refresh and functional block 44 to inhibit normal read or write operations by disabling the Row-Address-Strobe and the Column Address Strobe. Disabling the refresh operation allows the degradation of the capacitor charge storage for each bit in the array. Inhibiting normal read or write operations prevents refresh of the DRAM as well as preventing unauthorized access to the data in the DRAM.

To assure that all information in DRAM has degraded to an unrecoverable degree, the Row Address Strobe and the Column Address Strobe must be disabled for a sufficient period of time; longer than the manufacturer-specified refresh period. A functional block 46, decisional block 48, and decrement timer block 50 insures that the DRAM remains disabled sufficiently long.

During an extended inactive state of the device (greater than say two microseconds with device powered up), the wake up sequence (eight active cycles) of the initialization operation will be necessary to assure proper device operation. Accordingly, the system logic exits decisional block 48 along a path 52 and re-enters the logic loop above DRAM initialization block 30.

In summary, the present invention to provides security for printer/copiers which store job image data in memory before reproduction while overcoming the delay disadvantage associated with clearing memory by writing to memory locations. Data stored in DRAM will tend to degrade with time and temperature. Therefore, to retain the correct information, the bits need to be refreshed within a manufacturer-specified "refresh period". This property of DRAM, in which data stored therein will degrade if the device is not refreshed, is used in the present invention to provide job security. Upon completion of a "security" job, DRAM refresh and normal read or write operations are disabled for a time period sufficient to allow the data resident in the DRAM to degrade.

The invention has been described in detail with particular reference to preferred embodiments thereof, but it will be understood that variations and modifications can be effected within the spirit and scope of the invention.

What is claimed is:

1. In a copier/printer having a memory for storing job image data, the memory being of the type requiring periodic refresh to prevent degradation of stored data; the improvement comprising security means for disabling memory refresh for a time period sufficient to allow the data to degrade sufficiently to be unrecoverable in recognizable form.

2. The improvement defined in claim 1 wherein:
the memory is a dynamic random access memory refreshed by application of a Row-Access-Strobe clock signal; and
said security means comprises means for inhibiting application of Row-Access-Strobe clock signals to the dynamic random access memory.

3. The improvement defined in claim 1 wherein:
the memory is a dynamic random access memory refreshed by read and write operations; and
said security means comprises means for disabling read and write operations to the dynamic random access memory.

4. The improvement defined in claim 1 further comprising means for selectively enabling said security means.

* * * * *